United States Patent Office 3,290,168
Patented Dec. 6, 1966

3,290,168
BINDING AID FOR GOLD TRIM ON GLASS
Samuel Sterman, Tonawanda, N.Y., assignor to Union
Carbide Corporation, a corporation of New York
No Drawing. Filed Feb. 1, 1963, Ser. No. 255,644
13 Claims. (Cl. 117—71)

This invention relates to gold-trimmed glass objects and to an improved process for preparing same. More particularly, it relates to the improved use of aminoalkylalkoxysilanes as binding aid for gold trim on glass.

Gold trim is generally applied to glass by means of a solvent solution of a gold-organic compound, such as gold soaps (a gold salt of fatty acid, such as gold stearate, gold laurate or gold resinate). This gold soap, for example, is then reduced to metallic gold by methods known in the art. This prior art technique has disadvantages in that the bond between the reduced metallic gold and the glass substrate is not as strong as desired and the deposited gold often contains minute craters caused by bubble formation during deposition and reduction.

The applicant has now found that the presence of an aminoalkylalkoxysilane at the surface of the glass at the time the gold soap is applied results in a finished gold trim coating having improved strength and substantial elimination of craters. Such aminoalkylalkoxysilane may be applied to the glass surface prior to the application of the gold soap solution. This is conveniently accomplished by applying an aqueous solution of aminoalkylalkoxysilane to the glass surface and drying the resulting layer at room temperature. The gold soap solution can then be applied to the coated glass surface and reduced to gold trim by well-known techniques.

Alternatively, the aminoalkylalkoxysilane may be mixed with the gold soap solution and simultaneously applied to the glass surface. The gold solution containing the aminoalkylalkoxysilane can be applied to the glass surface by any well-known prior art technique, such as silk screening or direct printing. When the aminoalkylalkoxysilane is incorporated in the gold solution, it should be present in an amount from about 0.05 to about 25 weight percent based on total weight of solution. Preferably, the gold solution should contain from about 0.5 to about 15 weight percent aminoalkylalkoxysilane.

While I do not wish to be limited to any specific theory, it is believed that the aminoalkylalkoxysilane improves the bond of gold trim to glass in the following manner. The aminoalkylalkoxysilane strongly adheres to the glass surface through Si—O—Si bonds while the gold forms a coordinate complex with aminoalkylalkoxysilane.

Suitable for use in this process are the aminoalkylalkoxysilanes containing the group having the general formula:

wherein R is a divalent saturated aliphatic radical or divalent saturated or unsaturated cyclic hydrocarbon radical both having a chain of at least 3 carbon atoms and wherein nitrogen is attached to at least a third carbon atom removed from silicon, wherein each of the free bonds of the nitrogen atom is bonded to a member from the class consisting of hydrogen, hydrocarbyl, cyanoalkyl, aminoalkyl and [—(CH$_2$)$_a$Si≡] wherein $a$ is an integer having a value of at least 3, and wherein at least one free bond of silicon is attached to the oxygen atom of an alkoxy group and the remaining free bonds of silicon are attached to hydrocarbyl radicals, a "hydrocarbyl radical" as used herein refers to a monovalent group composed of carbon and hydrogen. Typical of the aminoalkylalkoxysilanes which may be employed for this invention are those compounds represented by the structural formula:

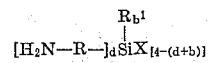

wherein R$^1$ represents an alkyl group such as methyl, ethyl, propyl and butyl and the like, or an aryl group such as phenyl, naphthyl and tolyl and the like, X represents an alkoxy group such methoxy, ethoxy and propoxy and the like, R is a divalent radical as described above and preferably has a carbon chain of from 3 to 4 carbons, $b$ is an integer having a value of from 0 to 2 inclusive and preferably a value of from 0 to 1 inclusive, $d$ is an integer having a value of from 1 to 2 inclusive, and the sum of $d+b$ is not greater than 3. Illustrative of such aminoalkylalkoxysilanes are gamma-aminopropyltriethoxysilane, gamma-aminopropyltripropoxysilane, gamma-aminopropylmethyldiethoxysilane, gamma - aminoproyl-ethyldiethoxysilane, gamma-aminopropylphenyldiethoxysilane, delta - aminobutyltriethoxysilane, delta - aminobutylmethyldiethoxysilane, delta-aminobutylethyldiethoxysilane, delta-aminobutylphenyldiethoxysilane, gamma-aminobutyltriethoxysilane, gamma - aminobutylmethyl-diethoxysilane, and the like. Such aminoalkylalkoxysilanes are disclosed and claimed in U.S. Patents Nos. 2,832,754 and 2,930,809. Processes for preparation of such compositions are also disclosed therein. The preferred material for use in the present invention is gamma-aminopropyltriethoxysilane. Diaminoalkylalkoxysilanes, such as NH$_2$(CH$_2$)$_2$NH(CH$_2$)$_3$SiX$_3$, are also useful in this invention. Such compounds are prepared by well-known techniques.

In an application of the present invention, a gold soap solvent solution containing 1 weight per cent gamma-aminopropyltriethoxysilane was applied to a glass surface by well-known silk screening techniques. The presence of the gamma-aminopropyltriethoxysilane reduced the surface tension of the solution so that better wetting of the glass through the silk screening and more efficient utilization of the gold solution were obtained. A net saving of 20–30 weight percent of the gold solution was indicated. There was also a 75 percent decrease in the number of minute craters formed in the gold trim metallic layer resulting from reduction of the gold soap solution as compared to prior art gold trim which did not employ the aminoalkylalkoxysilane. This coating of gold trim also has desirable bond strength to the glass surface.

What is claimed is:
1. In a process for applying gold trim to a glass surface which comprises applying a solution of a gold-organic compound to said glass surface and reducing the gold to a metallic layer on the glass surface, the improvement which comprises having an aminoalkylalkoxysilane present at the surface of the glass at the time the solution of gold-organic compound is applied to said surface.

2. In a process as claimed in claim 1 wherein said aminoalkylalkoxysilane is gamma-aminopropyltriethoxysilane.

3. In a process as claimed in claim 1 wherein a coating of an aminoalkylalkoxysilane is applied to the glass surface before applying the solution of gold-organic compound to said surface.

4. In a process as claimed in claim 1 wherein the aminoalkylalkoxysilane is mixed with the solution of gold-organic compound in an amount ranging from about 0.05 to about 25 weight percent based on the total weight of the solution and the mixture is then applied to the glass surface.

5. In a process as claimed in claim 4 wherein the mixture of aminoalkylalkoxysilane and solution of gold-organic compound contains from about 0.5 to about 15 weight percent aminoalkylalkoxysilane.

6. An improved composition for applying gold trim to glass surfaces which comprises a solution of a gold-organic compound containing from about 0.05 to about 25 weight percent aminoalkylalkoxysilane.

7. An improved composition as claimed in claim 6 wherein the aminoalkylalkoxysilane is gamma-aminopropyltriethoxysilane.

8. An improved composition as claimed in claim 6 wherein the gold-organic compound is a gold salt of a fatty acid.

9. An improved composition as claimed in claim 8 wherein the gold salt is gold stearate, gold laurate or gold resinate.

10. An improved composition for applying gold trim to glass surfaces which comprises a solution of a gold-organic compound containing from about 0.5 to about 15 weight percent aminoalkylalkoxysilane.

11. An improved composition as claimed in claim 10 wherein the aminoalkylalkoxysilane is gamma-aminopropyltriethoxysilane.

12. A glass surface containing an improved gold trim payer bonded thereto, said gold trim layer obtained by reducing the gold in a solution of gold-organic compound which has been applied to the glass surface in the presence of an aminoalkylalkoxysilane.

13. A glass surface as claimed in claim 12 wherein the aminoalkylalkoxysilane is gamma-amino-propyltriethoxysilane.

References Cited by the Examiner
UNITED STATES PATENTS

| | | | |
|---|---|---|---|
| 2,671,033 | 3/1954 | Waggoner | 117—71 |
| 2,832,754 | 4/1958 | Jex et al. | 161—184 X |
| 2,930,809 | 3/1960 | Jex et al. | 260—448.8 |
| 2,979,424 | 4/1961 | Whitehurst et al. | 117—126 X |

ALFRED L. LEAVITT, *Primary Examiner.*

MURRAY KATZ, *Examiner.*

J. R. BATTEN, JR., *Assistant Examiner.*